Jan. 4, 1938. O. SMITH 2,104,334
APPARATUS FOR CORRELATING DIETARY AND DIGESTIVE DATA
Filed July 3, 1936 3 Sheets-Sheet 1
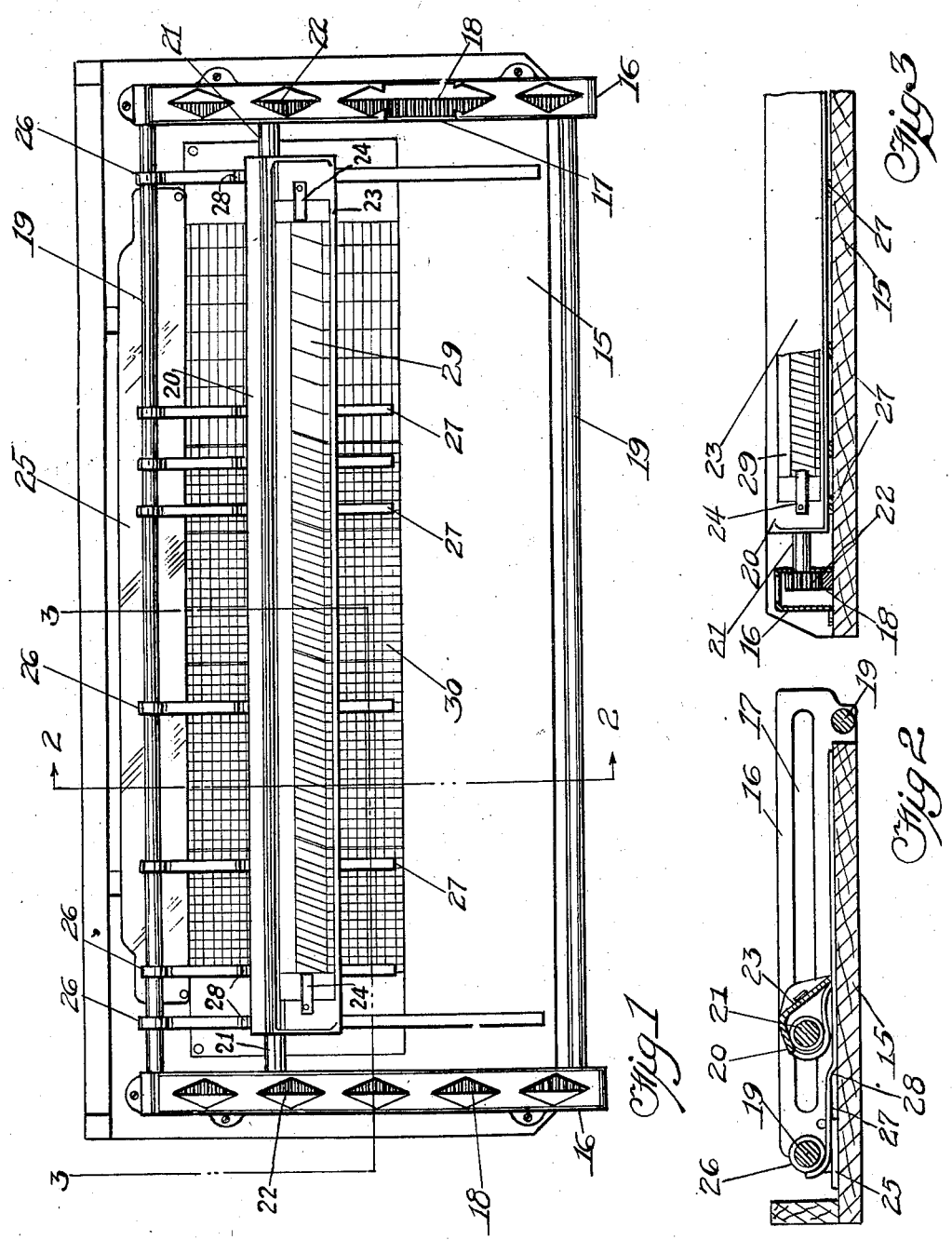
Inventor
Oakley Smith
Benj. J. Roodhouse Atty.

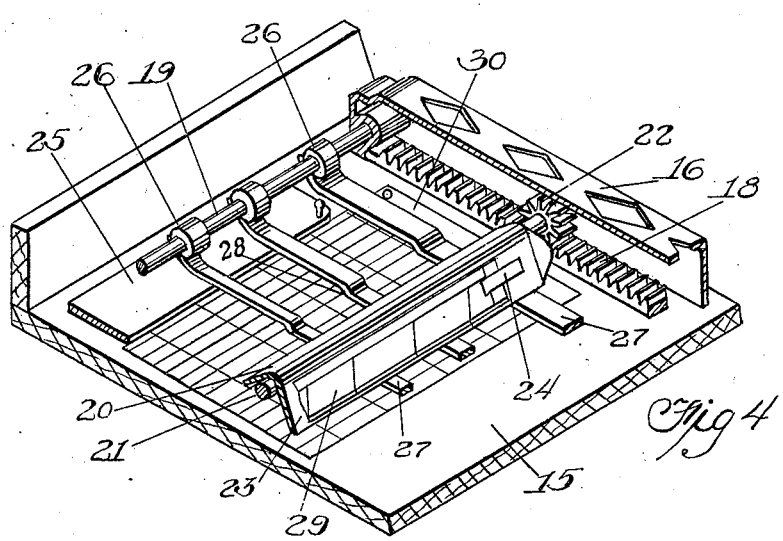
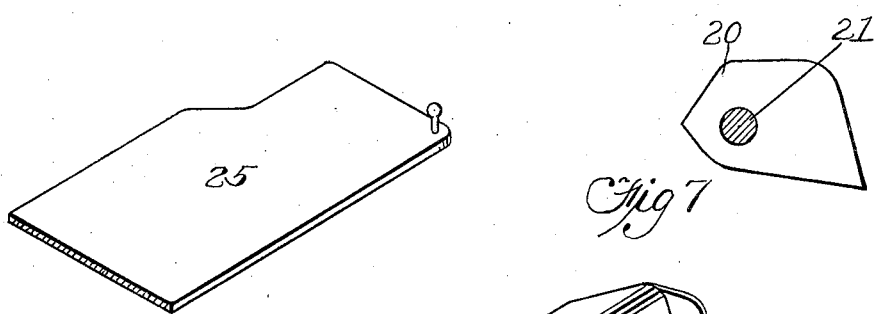
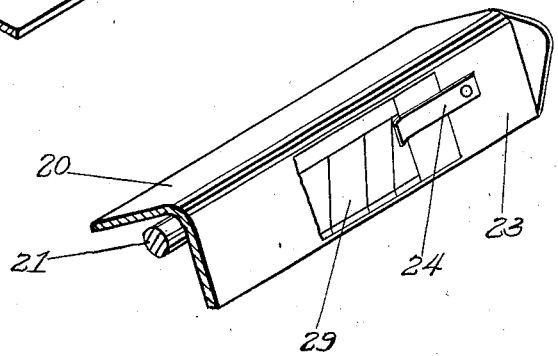

Figures 8, 9, 10:
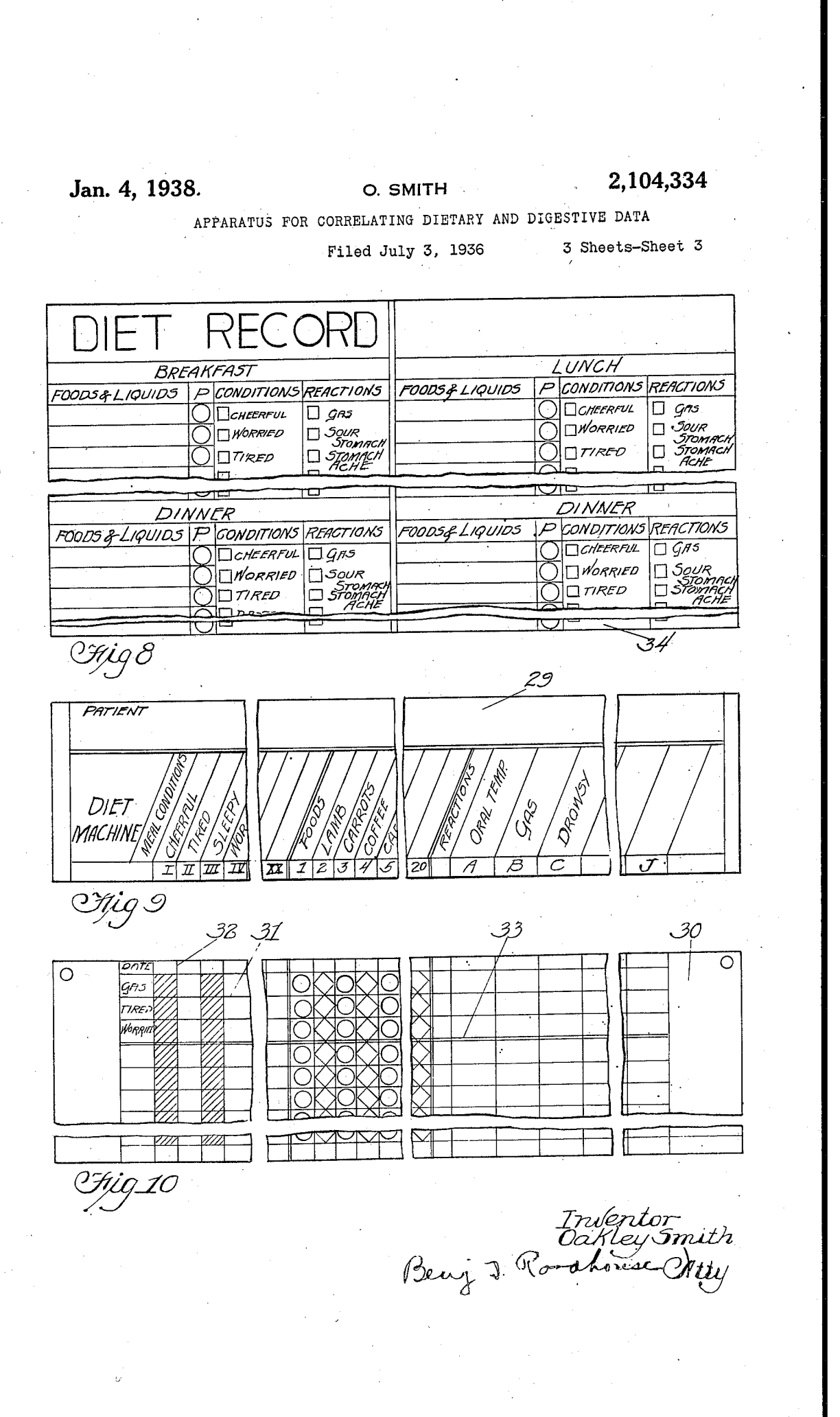

Jan. 4, 1938.     O. SMITH     2,104,334
APPARATUS FOR CORRELATING DIETARY AND DIGESTIVE DATA
Filed July 3, 1936     3 Sheets-Sheet 3

Inventor
Oakley Smith
Benj. J. Roadhouse, Atty

Patented Jan. 4, 1938

2,104,334

UNITED STATES PATENT OFFICE 2,104,334

APPARATUS FOR CORRELATING DIETARY AND DIGESTIVE DATA

Oakley Smith, Chicago, Ill.

Application July 3, 1936, Serial No. 88,844

4 Claims. (Cl. 281—1)

My present invention relates to the provision of means for correlating complex data, and more particularly data entering into and constituting factors of dietary and digestive experiences. The three most important groups of phenomena which are liable to constitute factors of digestive experiences are, first, the data relating to the physiological condition of the individual or patient under examination at the time of ingestion, which data are almost necessarily different for different patients, and are not infrequently different with the same patient at different times of ingestion. The second group of phenomena constitute the materials ingested, which, of course, may be, and sometimes comprise, a large number of different substances, particularly as I prefer to examine the usual dietary habits of the patient as shown by the facts relating to a number of usual meals taken in accordance with the usual habits instead of confining the patient to prescribed lines which may be, and usually are, considerably different from the patient's normal habits or customs, and the third group includes the reactions observable and noted at a definite time after ingestion.

It may readily be seen that these groupings constitute what may be called complexes, the effect and extent of action of any item or factor of which is highly problematical. That is, the most that usually can be said from an analysis of the record of a patient's dietary experiences is that a particular physiological condition, or a particular substance ingested, may or may not have an effect upon the reaction or result observed.

My present invention has to do with the provision of relatively simple means for the recording and the correlating of readily observable data which may constitute factors in digestion so as to facilitate the ascertainment of the numerical relationship which exists between an item or items of physiological condition with an item or items of material ingested and particular reactions which may follow.

I have attained the foregoing object by means of the structure and arrangement of parts shown in the accompanying drawings, in which—

Fig. 1 is a plan of the assembled apparatus.

Fig. 2 is a section on line 2—2 of Fig. 1.

Fig. 3 is a section on line 3—3 of Fig. 1.

Fig. 4 is a perspective fragmental detail, partially in section, showing assembly of moving carriage with end rail and assembly of adjustable vertical fingers or shields with a side rod.

Fig. 5 is a perspective fragmental detail of shield 25.

Fig. 6 is a perspective fragmental detail of one end of the carriage.

Fig. 7 is an end view or elevation of the carriage, the shaft supporting the carriage being shown in section.

Fig. 8 is a suggested form for use by the patient in securing data of dietary and digestive experiences.

Fig. 9 is a fragmental diagram of item form 29.

Fig. 10 is a fragmental diagram of recording form 30.

Similar reference characters refer to similar parts throughout the respective views.

The apparatus comprises a table or platform 15 at or adjacent the ends of which are firmly secured hollow, upstanding end rails 16—16, which are longitudinally slotted on their inner or facing vertical sides at 17, and upon the bottoms of the cavities in which are secured racks 18.

The ends of the end rails 16—16 are connected by rods 19—19. Extending between the end rails 16—16 is a carriage 20 supported upon a shaft 21 which projects beyond the ends of the carriage. The ends of the shaft 21 extends through the slots 17 in the end rails 16. Upon the ends of the shaft 21 are gear wheels 22 which travel within the hollow rails 16 and co-operate with the racks 18—18. This arrangement is to maintain the carriage 20 in parallelism with the rods 19—19. The carriage 20 is preferably formed to provide a top or platform 23 disposed obliquely with respect to the table 15. Suitable clips or other means 24 are provided at the respective ends of the top of the carriage 20 for securing the item form hereinafter described.

Mounted to move between the end rails 16—16 and parallel with the rods 19—19 is a shield 25 adapted to rest upon the platform or table 15 or upon the form secured to this table, which shield is preferably made of metal or other material sufficiently heavy to maintain it in its adjusted position until it may be desirable to move it therefrom.

The shield 25 may be moved back until one edge extends under one of the rods 19 when it is desired to get it out of the way for mounting on the table 15 the form, hereafter to be described, which I have provided for mounting thereon.

Slidably mounted upon one of the rods 19 are a plurality of collars 26, each of which has secured thereto a relatively narrow shield or finger 27 so that the collar 26 and finger or shield 27 attached thereto may be moved longitudinally with respect to the rod 19 and rotated thereabouts so as to extend at right angles to the rod 19 and parallel with the end rails 16—16, so that the fingers or shields may be extended vertically at any place across the form carried by or attached to the table 15.

I have preferably provided an offset 28 in the fingers or shields 27 so that the shield 25 may be moved beneath them. When they are disposed upon the top of the table 15 the carriage 20 may be moved above them without any interference between these parts.

The item form 29, secured to the inclined top of the carriage 20, as most clearly shown in Fig. 9, is preferably provided upon a piece of relatively long and narrow paper or tissue of suitable quality and consists of preferably diagonally arranged lines extending between the longitudinal edges. Between each pair of lines is to be entered an item which may probably or possibly constitute a factor in the patient's digestive experiences, which tends or may tend to the production of abnormal or undesirable reaction.

The order of the entry of the items on the item form 29 is not important in the correlations to be effected by the instrument, but I find it convenient in both making the entries and observing the correlations, as hereafter to be described, to group the items which would naturally come under the same heads, say in the group of items at the top or left of the item forms would be those denoting physiological condition of the patient at the time of ingestion. The next group of items to the right of the physiological group would be the substances ingested. The next group to the right of the group showing the substances ingested would be the kinds of reactions observed within a definite time after ingestion. The next group, if desired, could be items of procedure and a convenient final group is found to be items denoting the physiological or therapeutical significance of the observed result.

The data and result recording form 30, as most clearly shown in Fig. 10, which is to be affixed to the top of table 15 between the end rails 16—16 and rods 19—19, is characterized by longitudinal or horizontal lines 31 and transverse or vertical lines 32, the spacing of the transverse or vertical lines 32 being identical with the spacings of the oblique lines on the item form 29 so that in any position in which the carriage 20 comes to rest a vertical line of the form carried by the carriage will constitute an oblique extension of the transverse or vertical lines 32 of form 30.

A certain number of the longitudinal or horizontal lines 31 adjacent the longitudinal edge of the form constituting the top thereof are separated from the remainder of the horizontal lines upon the form by any desired variety of significant ruling, such as an extra heavy horizontal red or black line 33. Each of the horizontal lines below the line 33 is devoted to phenomena having to do with a particular meal, and in the first space or rectangle at the left end of each line is to be entered suitable designation of the meal, the facts in reference to which are to be recorded. Such designation would naturally be the date and time of its occurrence. The item form 29 is brought adjacent the space horizontally opposite this entry and such data as may be observable at that time is entered in the horizontal column opposite to the proper head on the item form 29.

The presence or absence or extent or acuteness of the phenomena or quantity of the material can easily be shown by a figure or simple symbol, which, of course, would have no significance except in association with the item form 29 and its position upon the recording form 30.

In order to easily and economically secure the data for entry I provide the patient with report form 34, as most clearly shown in Fig. 8, upon which in the proper squares the patient may readily enter the data required without the necessity of having special training in either observation or recording. The report with reference to a single meal may have considerable significance but the significance which the data for a single meal has, or may be supposed to have, is frequently either confirmed or given an entirely different significance when correlated and compared with the data from a sufficient number of meals so that the reactions may be regarded as consequential and not casual.

For instance, if the ingestion of a particular food, such as onions, during scattered meals was found to be regularly resultant in a particular form of distress or abnormality, there would exist a probability of relation between these items. Or for a further example, if a particular physiological condition at the time of ingestion, say observable depression, occurred uniformly with a certain variety of distress a consequential relation would probably exist between these items.

In making the analysis or correlations the relatively narrow shields or fingers 27 are employed. These are adjusted on the rod 19 so as to parallel the vertical columns, a correlation between which is sought. In this manner, for mechanical purposes, the complicated arrangement of characters appearing on form 30 may be, for all practical purposes, reduced to the one, two or more significant facts which are needed in any particular correlation, and in this connection it should be observed that a vacant space may have quite as much significance as a space containing a character in a particular correlation.

After having made the desired correlation and secured the answer it is at times desirable to preserve the answer so that the operations necessary for its ascertainment do not have to be performed again, and for this purpose I employ the horizontal lines 31 lying above the extra heavy horizontal red or black lines 33 on form 30. For example, if it were found after correlating the data of the respective meals separately that potatoes had been ingested during five such meals and that gas had developed in substantial quantities in four of the five meals in which potatoes had been ingested, I would enter at the left end of one of the horizontal lines 31 the word "gas" or terms to signify that the production of gas was the physiological result under investigation and on the same horizontal line opposite the item potatoes on the item form 29 would be entered the fraction "4/5" signifying that gas had developed upon four out of five occasions when potatoes had been ingested.

It has been found that there exist cases in which the ingestion of substances which are normally healthful and nutritious cause marked physiological disturbances. For instance, strawberries are known to disagree with certain people, while most people can eat them with benefit. Eggs and milk have also been known to seriously disagree with certain patients for reasons that are still obscure.

It is highly desirable and useful to have a name for such a substance when such a condition arises, and for such a purpose I have used and suggest the term "Dietite".

It may, and does, develop in certain cases that definite combinations of foods and physiological conditions uniformly produce abnormal results where the occurrence of the items separately do not appear to have any deleterious effect.

By means of the mechanisms heretofore described the correlation between the food ingested and the pertinent physiological condition can be found in relatively little time and without great trouble for a relatively large number of meals, whereas, the figuring of these correlations from the reports of the meals is a laborious and time consuming undertaking. After the items have been entered upon the item form 29 and the entries have been extended as above described upon the recording form 30, correlations may be sought without further entries between any two or more items for one or all of the meals with respect to which data has been entered.

Having described my invention what I claim is new and desire to secure by Letters Patent is:

1. An apparatus for correlating dietary and digestive data comprising a table, rails mounted upon said table adjacent and parallel with the ends thereof, a rod extending between said rails, a carriage disposed longitudinally of said table carried by and co-operating with said rails for movement thereon, a plurality of shields mounted upon said rod for rotative and longitudinal movement with respect to said table, means associated with said carriage for detachably securing an item form thereto and means associated with said table for securing and disposing a symbol receiving form upon said table beneath said shields and said carriage.

2. Apparatus for correlating dietary and digestive data comprising a table, a carriage, means for directing the movement of said carriage transversely of said table, said carriage having a top extending from adjacent said table and obliquely thereto, a plurality of shields, means for securing the ends of said shields whereby they may be both rotated and moved laterally of the path of movement of said carriage, means for detachably securing an item receiving sheet to said carriage and means for detachably locating a symbol receiving sheet upon said table.

3. Apparatus for correlating dietary and digestive data comprising a table, a carriage disposed longitudinally of said table and arranged for transverse movement with respect thereto, a plurality of relatively narrow shields disposed transversely of said table and arranged for longitudinal movement with respect thereto, means associated with said carriage for detachably receiving a character receiving element and means for detachably locating a character receiving element upon said table beneath said shields and carriage.

4. An apparatus for correlating dietary and digestive data comprising a member providing a symbol receiving surface, a second member provided with an item receiving surface, means for directing the movement of said member having an item receiving surface transversely of said member having the symbol receiving surface, and a plurality of shields mounted to secure their rotation to bring them between and to remove them from between said members and to move them laterally between said members.

OAKLEY SMITH.